United States Patent
Gupta (10) Patent No.: US 11,354,419 B2
(45) Date of Patent: Jun. 7, 2022

(54) ENCRYPTION OF APPLICATION DATA USING FIELD-LEVEL METADATA

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 752 days.

(21) Appl. No.: 15/223,962

(22) Filed: Jul. 29, 2016

(65) Prior Publication Data

US 2018/0032739 A1 Feb. 1, 2018

(51) Int. Cl.
*G06F 21/60* (2013.01)
*G06F 9/46* (2006.01)
*G06F 21/62* (2013.01)

(52) U.S. Cl.
CPC ........... *G06F 21/602* (2013.01); *G06F 9/465* (2013.01); *G06F 21/6218* (2013.01); *G06F 2221/2107* (2013.01)

(58) Field of Classification Search
CPC .... G06F 21/602; G06F 9/465; G06F 21/6218; G06F 2221/2107
See application file for complete search history.

(56) References Cited

U.S. PATENT DOCUMENTS

| | | | | |
|---|---|---|---|---|
| 2010/0257351 A1* | 10/2010 | O'Connor | ............ | H04L 9/0894 713/150 |
| 2011/0283256 A1* | 11/2011 | Raundahl Gregersen | ................... | G06F 8/656 717/108 |
| 2013/0297654 A1* | 11/2013 | Khimich | ............. | G06F 21/6227 707/783 |
| 2014/0164318 A1* | 6/2014 | Tsai | ....................... | G06F 16/958 707/609 |
| 2015/0188890 A1* | 7/2015 | Said | .................... | H04L 63/0428 713/168 |
| 2015/0379299 A1* | 12/2015 | Klein | .................. | G06F 21/6227 713/193 |
| 2016/0277368 A1* | 9/2016 | Narayanaswamy | ......................... | G06F 21/6218 |
| 2017/0206362 A1* | 7/2017 | Calahan | .................. | G06F 16/22 |
| 2017/0279689 A1* | 9/2017 | Mohan | ................ | H04L 41/0893 |

OTHER PUBLICATIONS

U.S. Appl. No. 15/067,164, filed Mar. 10, 2016.
U.S. Appl. No. 15/147,143, filed May 5, 2016.

* cited by examiner

*Primary Examiner* — Alexander Lagor
*Assistant Examiner* — Forrest L Carey
(74) *Attorney, Agent, or Firm* — Mintz Levin Cohn Ferris Glovsky and Popeo, P.C.

(57) ABSTRACT

Techniques are provided for identifying and encrypting fields of an application object at an application layer in a multi-tenant cloud architecture, using an object metadata structure of the application object. Accordingly, transparent, per-tenant encryption capabilities are provided, while enabling transfer of encrypted object data between the application layer and a storage layer.

14 Claims, 5 Drawing Sheets

ENCRYPTION OF APPLICATION DATA USING FIELD-LEVEL METADATA

TECHNICAL FIELD

This description relates to data encryption.

BACKGROUND

For data that is intended to be private and restricted, encryption of the data is a high priority. However, encryption typically utilizes appreciable time and resources. For example, bulk encryption efforts of large amounts of data may consume relatively large amounts of time and computing resources. Similarly, but on a smaller scale, encryption of even small amounts of data may be problematic, such as when access to the data is required in real time and even relatively small delays are unacceptable.

Often encryption is provided as a service, such as by an application provider to a customer. In these cases, the provider of the encryption service is charged with maintaining the safety and integrity of the data, while still providing a desired access level to the data. Moreover, in addition to the time and resource constraints referenced above, it is possible that a given encryption scheme may be compromised by hackers or other illicit users. Consequently, for these and other reasons, it is challenging to provide data encryption.

SUMMARY

Techniques are provided for identifying and encrypting fields of an application object at an application layer in a multi-tenant cloud architecture, using an object metadata structure of the application object. Field level metadata of the object level metadata structure can be modified to indicate encryption is available and requested for a corresponding field and associated field value of the application object. Then, if both the object metadata structure and the application object are loaded into a memory of the object-oriented application, the object metadata structure can be examined to determine field-level encryption requirements for the application object. Accordingly, an efficient data model is provided, and storing of configuration data for encryptable fields is performed in a highly customizable manner. As a result, transparent, per-tenant encryption capabilities are provided, while enabling transfer of encrypted object data between the application layer and a storage layer.

The details of one or more implementations are set forth in the accompanying drawings and the description below. Other features will be apparent from the description and drawings, and from the claims.

DETAILED DESCRIPTION

Figure 1:
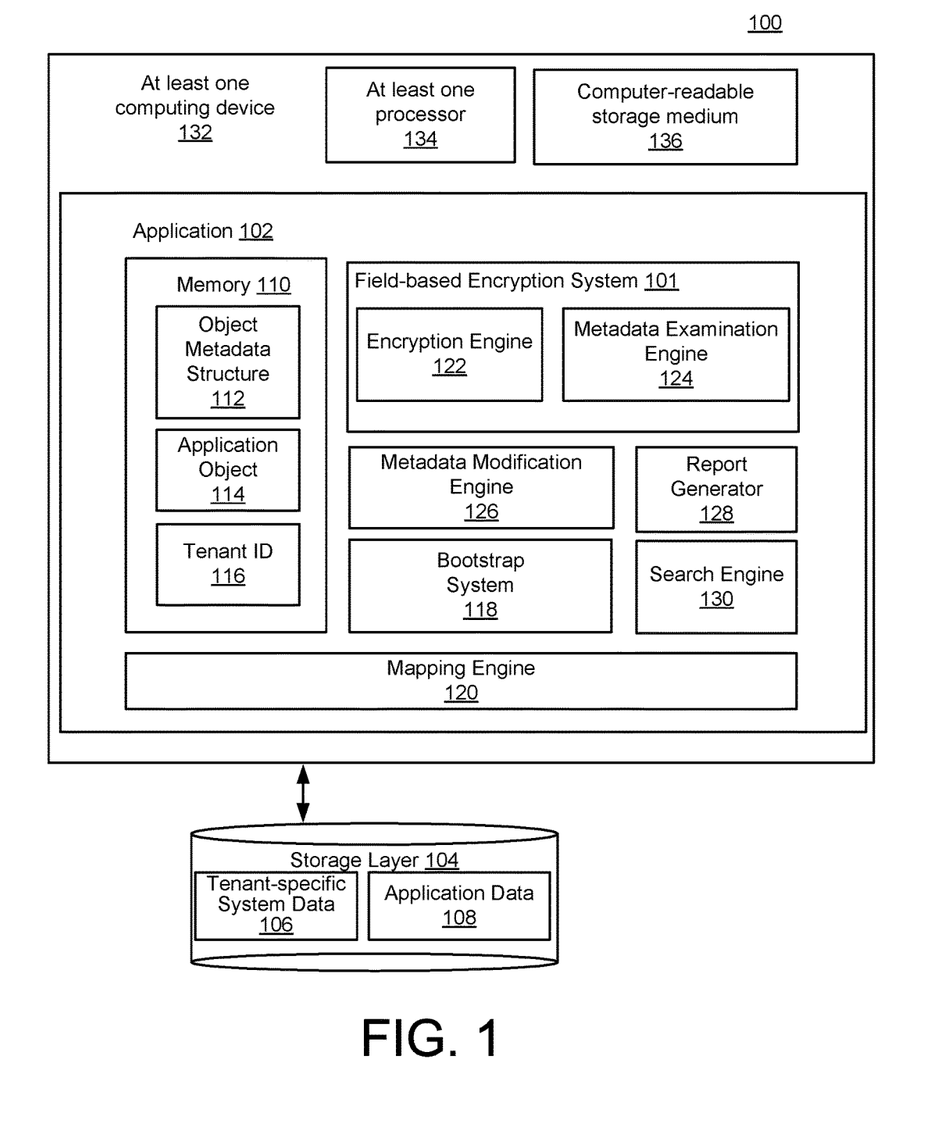
FIG. 1 is a block diagram of a system for encryption of application data using field-level metadata.

FIG. 1 is a block diagram of a system 100 for encryption of application data using field-level metadata. In the example of FIG. 1, a field-based encryption system 101 is configured to provide data encryption in a fast, resource-efficient manner. The field-based encryption system 101 is further configured to adapt quickly, e.g., in response to a situation in which a security breach may have occurred, or to scenarios in which users perform modifications to system data or a manner in which system data is stored. For example, the field-based encryption system 101 may be configured to encrypt new data (e.g., data within new data field), or update the provided encryption using a new encryption algorithm, with little or no downtime of the system 100 as a whole.

In the example of FIG. 1, an object oriented software application 102 is illustrated and may be understood to represent one of many different types of object oriented software applications that exist today, or may be created in the future. Various specific examples of the object oriented software application 102 are provided below, or would be apparent to one of skill in the art. For example, applications may include enterprise resource management (ERM) systems, supply chain management (SCM) systems, or various other business applications related to management of customers' human resources or financial management.

In general, however, it will be appreciated for purposes of understanding operations of the system 100 of FIG. 1 that the object oriented software application 102 is constructed and executed in a manner that utilizes individual software objects to perform functionalities of the application 102. In this context, software objects, or objects, should be understood to refer to discrete, encapsulated software constructs that may correspond, for example, to individual, discrete entities, and which include, e.g., data that relates to that entity, as well as instructions or procedures for processing the included data. For example, with reference to the example applications just referenced, an object may refer to, or represent, a document (e.g., a sales order), a person, an inventory item, an account, or virtually any real-world, tangible or intangible entity that might be represented within, and processed by, the application 102.

Various potential advantages associated with such software objects in the context of the application 102, such as efficiencies in the development or maintenance of the application 102, or a speed or flexibility of the operations thereof, are generally well known, and are not described herein in detail, except as may be necessary or helpful in understanding operations of the system 100 of FIG. 1. Further in FIG. 1, and notwithstanding the various advantages just referenced with respect to use of object oriented programming techniques in the context of the application 102, it may be necessary or helpful to store data associated with use of the application 102 within a separate storage layer 104, which may include one or more database systems. For example, such separate data storage may be useful when the application 102 is not currently in use, or not in use by a particular user, or when a particular user of the application 102 requires only a subset of available data associated with the application 102 at a particular point in time.

Moreover, using the storage layer 104 for bulk storage of data may be more cost efficient, particularly when large quantities of data are required to be stored, accessed, maintained, shared between multiple systems, or otherwise utilized. In particular, such economies of scale, and other advantages, may be obtained in the context of implementing the application 102 and the storage layer 104 in a multi-tenant environment.

In other words, it is possible to provide use of the application 102, as well as storage of associated data, in the context of a service(s) provided to a plurality of customers/entities, referred to herein as tenants. For example, in scenarios in which the application 102 represents business software, then each such tenant may represent a particular business that pays fees associated with accessing and utilizing the system 100.

In the simplified example of FIG. 1, the storage layer 104 is illustrated as including tenant-specific system data 106, which generally represents all tenant-specific data associated with identifying, and otherwise managing, tenants having access to the system 100. For example, the tenant-specific system data 106 may identify individual tenants, as well as terms of use, quality of service agreements, authentication requirements, and any other data that may be useful in providing features and functions of the system 100 to individual tenants on a tenant-by-tenant basis. Of course, the storage layer 104 also may include various other types of system data associated with configuring, maintaining, and running the one or more database systems of the storage layer 104, although such system data is not necessarily described completely herein, for the sake of brevity and clarity.

The storage layer 104 is also illustrated as including application data 108. In this regard, it will be appreciated that the application data 108 refers generally to application-specific data that may be utilized to execute specific instances of the application 102 for individual tenants. In some implementations, a single tenant of the tenant-specific system data 106 may utilize two or more applications provided by a provider of the system 100, so that data is stored in the application data 108 in conjunction with its corresponding application for that tenant. In general, application data for multiple tenants and multiple applications may be stored together within the storage layer 104, including even within a single table of a single database.

In providing the application 102 and associated resources to the various tenants, the provider of the system 100 is typically required to maintain and ensure a desired type and extent of safety, integrity, security, and/or confidentiality of data belonging to each tenant that is stored within the application data 108. For example, as just referenced above, data that is private to a particular tenant may nonetheless be stored together within the storage layer 104 with private tenant-specific data of another tenant. Consequently, each tenant may be concerned that private data may be inadvertently or illicitly obtained by another tenant, by the provider of the system 100, or by any unauthorized party.

It is possible for the provider of the system 100 to provide a measure of data security through the use, e.g., of proper hardware and software provisioning and configuration, using various known techniques to maintain separation between, and limit access to, the various types of tenant-specific data. While these approaches may be sufficient in some cases, it may be necessary or desirable in other cases to provide encryption of private data, using one or more known encryption/decryption techniques.

In practice, however, existing encryption techniques may be expensive, time-consuming, and/or resource intensive, and, if not executed properly, may lead to various errors or malfunctions in operations of the system 100. For example, the computationally-intensive nature of many encryption techniques, combined with the potentially large quantity of data within the storage layer 104 and/or a potentially large number of tenants utilizing the system 100, may result in conventional encryption techniques being impractical or impossible to implement in an efficient or realistic manner, or in a manner that is acceptable to either the provider of the system 100 or the tenant requesting the encryption.

Moreover, it may be appreciated from the above description that some tenants may request encryption of some or all of their tenant-specific data, while other tenants may request no encryption and/or different types of encryption. Consequently, it may be difficult in existing systems even to determine whether and/or how particular data records are encrypted, such as when extensive lookup operations are required to successfully identify and execute suitable encryption procedures for particular data. Consequently, various difficulties may arise, such as when encrypted data is processed inadvertently as being non-encrypted (e.g., searching encrypted data inappropriately will lead to empty search results, even when the desired data is included and available). Further, of course, processing unencrypted data that was desired to be encrypted will lead to a lower level of security than that desired by the owner of the data in question.

Accordingly, the application 102 and the system 100 may be configured and implemented to provide encryption in a manner that is highly configurable and flexible, and that minimizes computational resources required. Moreover, as also described below, the encryption techniques implemented at the application 102 result in data being encrypted even during a time of transfer between the application 102 and the storage layer 104, thereby providing an additional layer and type of security for the encrypted data.

In more detail, as illustrated, the application 102 includes, and/or has access to, an application memory 110. As shown, the memory 110 may be utilized to store an object metadata structure 112 for an application object 114. As also illustrated in FIG. 1, the memory 110 may be utilized to store a tenant identifier (ID) 116 that identifies the tenant associated with the object metadata structure 112, the application object 114, and any related data, as obtained from the tenant-specific system data 106.

In general, the object metadata structure 112 may be understood to characterize techniques for constructing, processing, or otherwise utilizing the application object 114. For example, as described in detail below with respect to the example object metadata structure 200 of FIG. 2, the object metadata structure 112 may define individual fields and associated attributes that may be included therein for the application object 114. As also described in detail below with respect to FIG. 2, all of the metadata related to the object-related fields, sometimes referred to herein as Field-Meta, may be associated with a corresponding class of the object metadata structure 112, where metadata characterizing the class(es) of the application object 114 may be referred to as class meta.

In the highly simplified example of FIG. 1, for purposes of illustration and explanation, the object metadata structure 112 is illustrated as a single object metadata structure, associated with the single application object 114. In practice, the object metadata structure 112 may also be associated with a larger object model domain, in which a plurality of object metadata structures govern a corresponding plurality of objects, and in which the various object metadata structures (and associated objects) may inherit properties from, or otherwise be related to, other structures/objects.

The application 102 also includes, or is associated with, a bootstrap system 118 that is configured to perform various conventional boot operations associated with booting or loading the application 102. In example implementations, application instances of the application 102 may be shared among multiple tenants, and the bootstrap system 118 also may be configured to execute any tenant-specific bootstrap operations for a particular tenant mapped to a particular application instance.

Additionally, the bootstrap system 118 may be configured to facilitate the types of encryption operations referenced above, in conjunction with a loading of the object metadata structure 112, the application object 114, and the tenant ID 116 from the storage layer 104 into the memory 110. In particular, at a time of booting, the bootstrap engine 118 may operate in conjunction with a mapping engine 120 to facilitate a loading of the object metadata structure 112, the application object 114, and the tenant ID 116 from the storage layer 104 into the memory 110.

For example, in specific implementations, as described in more detail below, the mapping engine 120 may represent an object to relational mapping (ORM) engine. Such mapping may be utilized when the storage layer 104 is a relational database, and therefore not directly compatible with the object-oriented data structures of the application 102. In other words, it may be more convenient, efficient, or cost-effective to store data of the storage layer 104 in a relational manner, even though it may be more practical, faster, or otherwise preferable to utilize object-oriented techniques with respect to execution of the application 102.

The application 102 further includes an encryption engine 122 that is configured to provide one or more types of data encryption, e.g., for data to be encrypted and sent to the storage layer 104. Further, the encryption engine 122 is configured to provide decryption of encrypted data, as such encrypted data is loaded from the storage layer 104, or otherwise processed. Consequently, it will be appreciated that the term "encryption" may be used herein in a general sense to include encryption and decryption operations and related operations, except when specific encryption or specific decryption operations are referenced or described separately.

In order to instruct the encryption engine 122 with respect to whether and how to encrypt/decrypt specific data in a manner that is efficient, practical, fast, and reliable, a metadata examination engine 124 is configured to analyze or examine the object metadata structure 112 and thereby determine which, if any, fields of the application object 114 should have included data encrypted/decrypted by the encryption engine 122.

In operation, the metadata examination engine 124 is configured to examine each individual FieldMeta characterizing a corresponding field of the application object 114. In so doing, the metadata examination engine 124 may determine whether an individual FieldMeta (and associated field) is identified as being encryptable. For example, if the object metadata structure 112 is constructed as a graph, as in the example of the graph illustrated and described below with respect to FIG. 2, then the metadata examination engine 124 may be configured to traverse the graph, identify each FieldMeta, and determine whether each identified FieldMeta is encryptable. In example implementations, a field may be marked as encryptable by its FieldMeta in the sense that the system 100 is then provided with an ability to encrypt data within that field within a live instance of a corresponding object of a tenant, but will only actually do so in scenarios in which that tenant has opted-in and requested such encryption.

Techniques for marking an individual FieldMeta of the object metadata structure 112 for encryption are described below. By way of example, however, an individual FieldMeta of the object metadata structure 112 may be marked for encryption/decryption during an initial development of the application 102, and/or of a corresponding object model domain. Additionally, or alternatively, a metadata modification engine 126 may be provided that is configured to enable a runtime modification of the object metadata structure 112, including the marking of a particular FieldMeta for encryption (or no encryption).

For example, in many scenarios, an initial or generic version of the application 102 and associated object model domain may be created by a provider of the system 100, and may be provided to a plurality of tenants. The various tenants, however, may have somewhat different desires or requirements with respect to operations of the application 102. It is a feature of the system 100 to provide runtime customization of the object metadata structure 112, to thereby provide individual tenants with the flexibility to modify operations of the application 102 in a desired manner. Accordingly, in conjunction with the various features and functions of the system 100 of FIG. 1 as described herein, the metadata modification engine 126 enables each tenant to specify, at a field level, a manner and extent to which data of that tenant will be encrypted.

Since, as described, encryption/decryption is executed within the encryption engine 122 within the application 102 itself, data may be encrypted, if desired, when stored within the storage layer 104, as well as during transfer between the storage layer 104 and the application 102 (e.g., when "in motion" between the storage layer 104 and the application 102), and may be decrypted only when, and to the extent, required for the processing in question.

For example, as already described above, it may be desirable to decrypt data when loading a live instance of the application object 114 into the memory 110. In other examples, the application 102 may include a report generator 128 that is configured to generate reports with respect to tenant-specific application data. Similarly, a search engine 130 may be configured to execute a search of tenant-specific application data of the application 102. Other types of data processing, such as various data updates or specific interactions with other applications, may be associated with, or require, decrypted data. In all such examples, it will be appreciated that the techniques of the system 100 of FIG. 1 provide for the types of flexible, efficient, fast, and reliable encryption/decryption techniques described herein.

In the example of FIG. 1, the application 102 is illustrated as being executed using at least one computer 132, which itself includes at least one processor 134 and a non-transitory computer readable storage medium 136. In other words, for example, the at least one computing device 132 may represent two or more computing devices in communication with one another, such as in a client/server architecture implemented over a computer network.

Somewhat similarly, the at least one processor 134 may represent two or more hardware processors operating in parallel. The non-transitory computer readable storage medium 136 may generally represent any suitable storage medium designed to store instructions which, when executed by the at least one processor 134, provides an executable version of the application 102.

Accordingly, it will be appreciated that the application 102 is illustrated as including the plurality of components/sub-components 110-130, but that, in various implementations, it may occur that one or more of these components/ sub-components is implemented using two or more further sub-components. Similarly, but conversely, it will be appreciated that any two or more of the components/sub-components may be combined for execution as a single component. Even more generally, it will be appreciated that the system 100 of FIG. 1 is intended merely as a non-limiting example of various embodiments that may be provided using the various techniques, features, and functions described herein, and that additional or alternative variations may be implemented by one of skill in the art.

Figure 2:
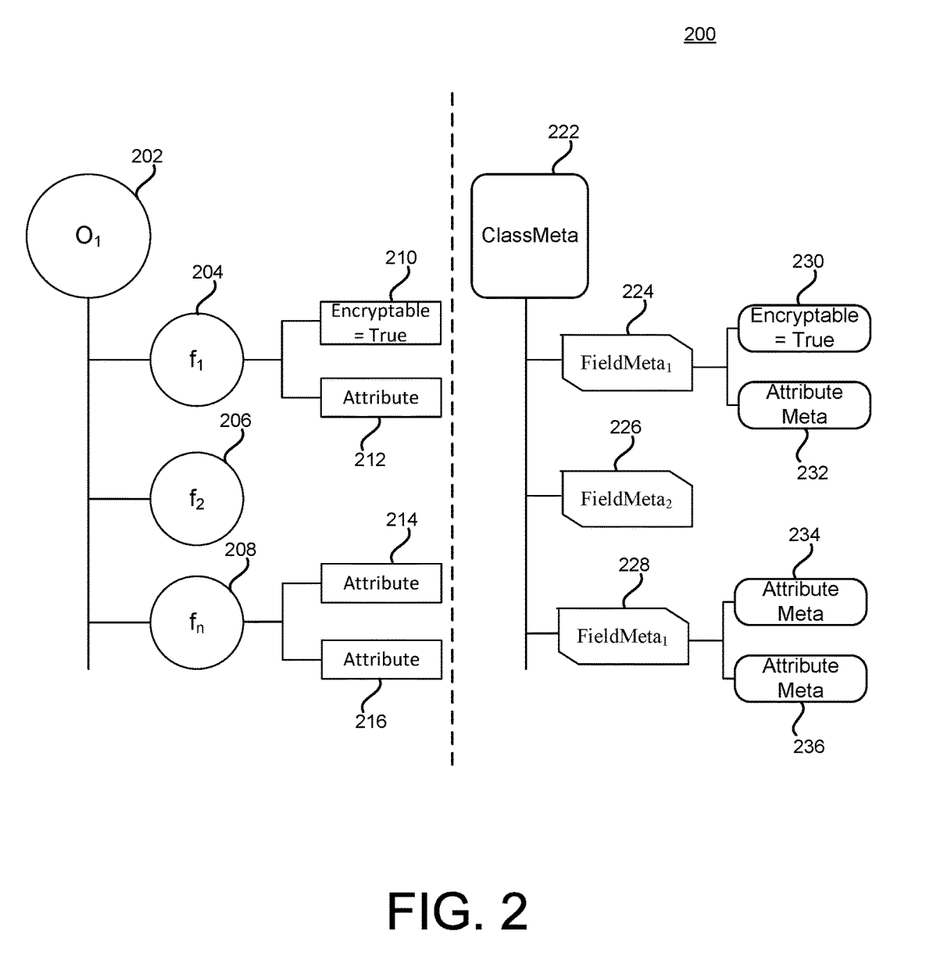
FIG. 2 is a block diagram illustrating an association between an object and its metadata.

FIG. 2 is a block diagram illustrating an association 200 between an object and its metadata. As illustrated, an object (or a class) 202 may include a plurality of fields 204, 206, 208. Each field may be associated with one or more attributes. As shown, the field 204 is associated with attributes 210, 212, and the field 208 is illustrated as being associated with attributes 214, 216. As described in detail below with respect to FIG. 5, the fields 204, 206, 208 may be classified as a primitive type (e.g., integer), or a complex type (e.g., another class or object). An attribute may have defined potential or available values, such as true/false, or a range of numerical values.

Meanwhile, object metadata may include metadata 222 for the object (or the class) 202, and is illustrated in the example of FIG. 2 as ClassMeta222. As shown, the ClassMeta222 may include a FieldMeta 224, FieldMeta 226, and FieldMeta 228. As may be observed, the FieldMetadata 224, 226, 228 correspond directly to the fields 204, 206, 208, respectively, of the object 202. Further, and similarly, each FieldMeta may be associated with corresponding attribute metadata. For example, as shown, the FieldMeta 224 is shown as being associated with attribute metadata 230, 232 (corresponding to attributes 210, 212, respectively of the object 202), while the FieldMeta 228 is illustrated as being associated with attribute metadata 234, 236 (corresponding to attributes 214, 216, respectively).

With reference to FIG. 1, it will be appreciated that FIG. 2 illustrates an example of the object (or class) 114, illustrated as the object 202, as well as an example of the object metadata structure 112 (illustrated as ClassMeta222). In the example of FIG. 2, the ClassMeta222 of the metadata structure provides a metadata graph of an object model, which, as referenced above and described in detail below, may be traversed to determine characteristics thereof. For example, the metadata examination engine 124 of FIG. 1 may be configured to access the object metadata structure 112 for the application object 114 within the memory 110, as part of efforts related to encrypting or decrypting data of the application object 114.

As also referenced above, at a time of system bootstrap using the bootstrap system 118, objects/classes (e.g., base classes, as well as tenant-customized classes that may have been specified using the metadata modification engine 126) may be loaded. Then, metadata graphs, such as the runtime object metadata structure 112, may be constructed in conjunction with the loading of the classes/objects. The constructed metadata graph may be traversed to determine whether, how, and to what extent the data of the application object 114 should be encrypted/decrypted.

In addition to bootstrap-related operations, a similar traversal of the object metadata structure 112 may occur at other times of operations of the system 100. For example, when a tenant modifies or customizes a class at system runtime, using the metadata modification engine 126, the metadata examination engine 124 may proceed to traverse the graph of the object metadata structure 112, and determine any changes that may have been made with respect to requirements for encrypting individual fields of the application object 114.

In particular, as referenced above and described in detail below, the system 100 enables field-specific designations of encryption requirements. For example, as shown in FIG. 2, the FieldMeta 224 may have AttributeMeta 230 indicating that the field 204 is designated as encryptable. Then, as also illustrated, the attribute 210 may have a value set to "encryptable=true."

For example, the metadata examination engine 124 may be configured to define a hash table specifying computations to be performed to decide whether a class/object has encryption requirements. For example, such rules may be written as expressions based on the class meta, FieldMeta, and attribute meta structures, so that these expressions may be evaluated, for example, during a time that the metadata structure 112 is loaded. For example, in the simplified example of FIG. 2, the metadata examination engine 124 may thus determine that encryption is required for a particular field if, for example, a field type of the field is "string," and an associated field attribute for encryption is marked as "true." Rules and expressions of the metadata examination engine 124 may be extensible and modifiable, as needed.

In some example implementations, the metadata modification engine 126, enables customization of object models by individual tenants, in order to suit individual needs of those tenants. For example, it may occur that the object 202 is shared by multiple tenants, and an initial version of the object 202 is thus the same for all of the tenants. However, after a customization by a particular tenant, another version of the object 202 may include a new field, or a new attribute for an existing field. As described, such modifications may occur during runtime of the system 100.

In practice, each such change may be applied to the metadata version of the objects in question for the particular tenant. When the object metadata structure 112 is modified in memory for the memory 110, the metadata modification engine 126 may automatically cause the metadata examination engine 124 to re-examine the object metadata structure 112 to determine whether encryption requirements have been changed.

Thus, the application object 114 stores classes or objects that are loaded, e.g., automatically during operations of the bootstrap system 118. In other scenarios, classes or objects may be loaded when queries for the classes or objects are received during system runtime. The runtime object metadata structure 112 stores metadata of classes/objects when the classes/objects are loaded into the application object 114. Consequently, it is straightforward for the metadata examination engine 124 to examine the object metadata structure 112 and determine whether and how individual fields of the application object 114 should be encrypted/decrypted.

FIGS. 1 and 2 illustrate and describe example techniques for metadata-driven identification and encryption of data fields at an application layer of a multi-tenant cloud architecture, thereby allowing encryption capabilities in the cloud. Described techniques facilitate the resource-intensive process of encrypting customer data in such a multi-tenant environment, including effectively reducing the amount of computing resources and time required to execute encryption techniques, even when changing requirements and sensitivity of newly added data lead to requests for additional fields to be added and encrypted within an existing object model.

In particular, the techniques of FIGS. 1 and 2 provide an approach for identifying fields in the object model that will require encryption, to perform encryption on the identified fields on the fly within the system 100. Moreover, as described herein, such encryption may be performed at the application layer, without requiring modifications of any object relational mapping requirements that may be in place, thereby ensuring that data is encrypted even during transportation thereof between the application layer and a separate storage layer. As may be appreciated, such a metadata-driven approach leads to an efficient data model, as well as the storing of configurations of encryptable fields in the metadata defining the structure of the field within the object model.

Figure 3:
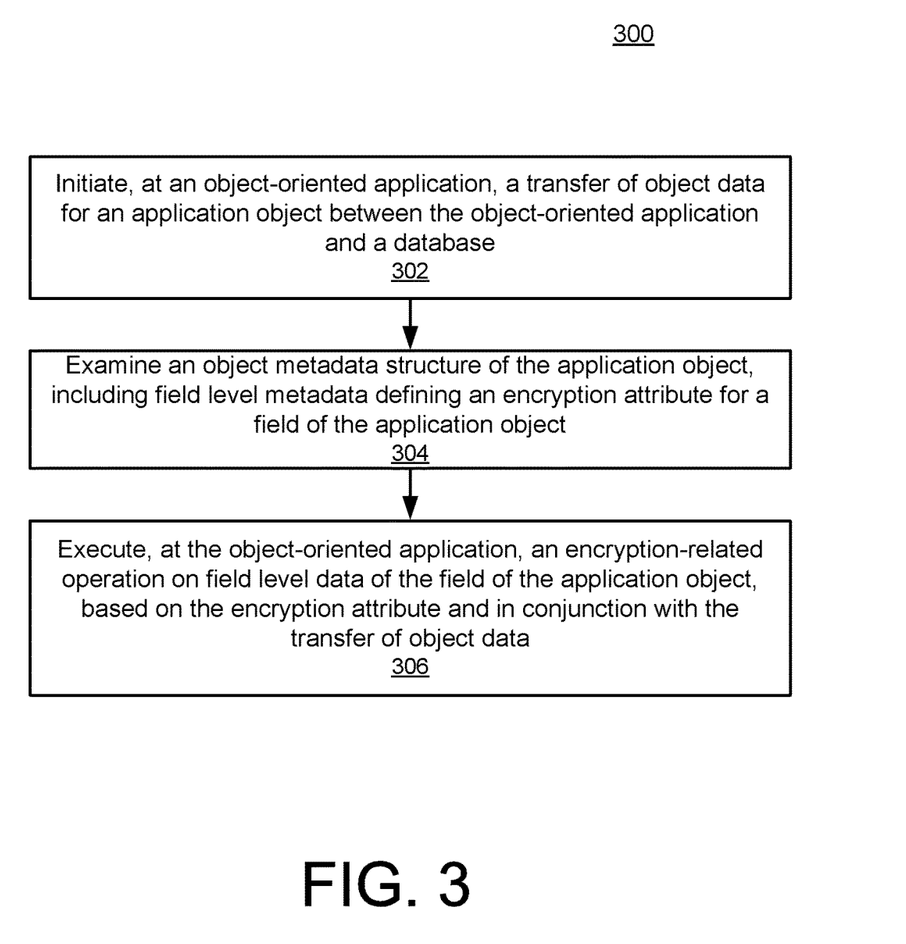
FIG. 3 is a flowchart illustrating example operations of the system of FIG. 1.
Figure 4:
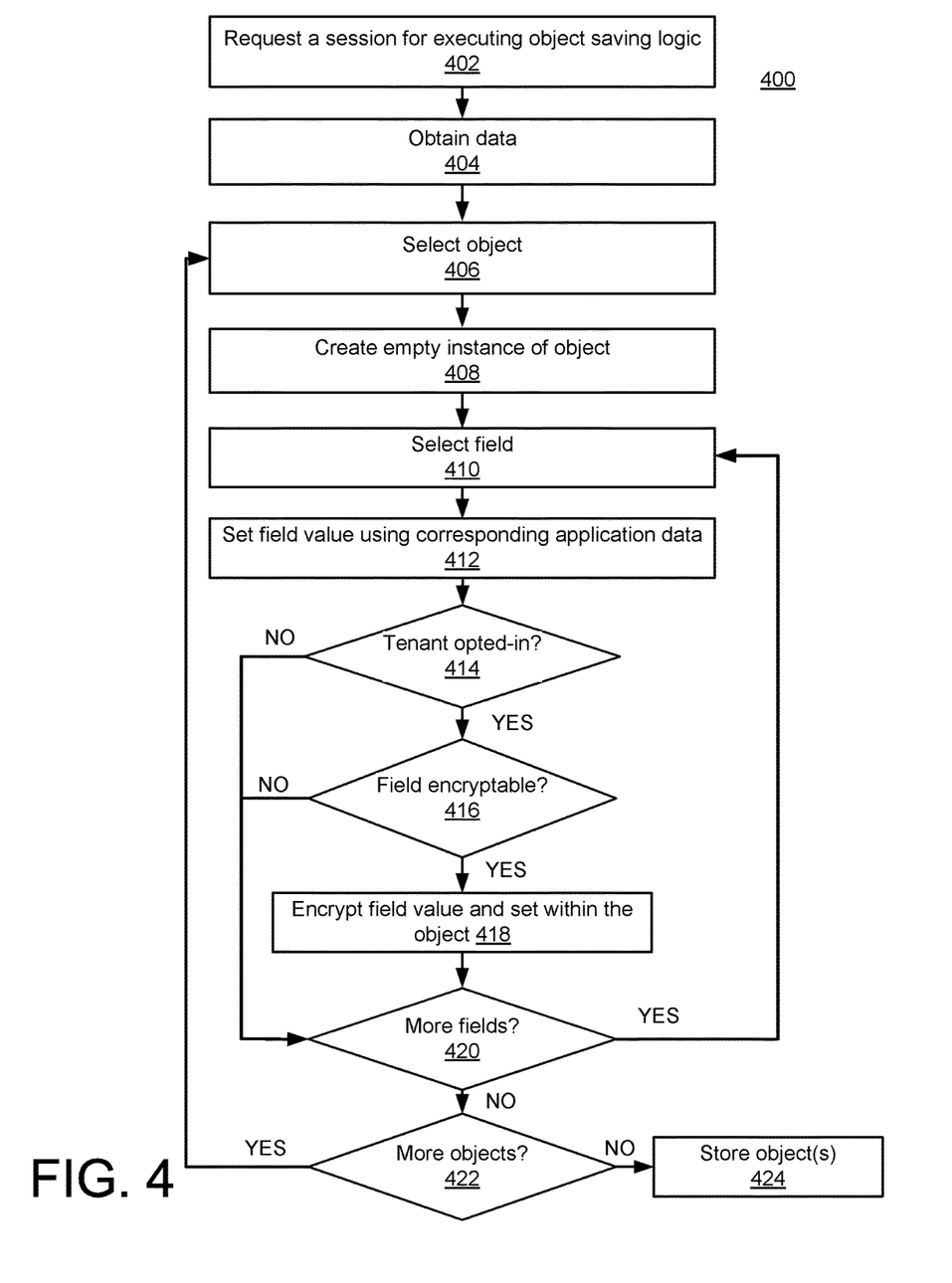
FIG. 4 is a flowchart illustrating example object saving logic that may be implemented using the system of FIG. 1.

The following description provides a more specific, non-limiting example implementation that may be provided using the system 100 of FIG. 1, including various example pseudo code sections, and with reference to FIGS. 3 and 4. For the sake of the simplified, explanatory example, it is assumed that a user of the system 100 wishes to define an object within the application 102 named "business object," and including three fields: name, phone, and address. It is further assumed that an appropriate meta language (e.g., the eXtensible Markup Language (XML), or variations thereof, or other suitable language) may be used. Such a meta language may be used to define the example object, as well as each object that may be stored within the storage layer 104 as a cluster root. Thus, pseudo code 1 provides an example for the sample business object in the appropriate meta language:

Pseudo code 1

```
<cluster-root name ="com.buisness.BusinessObject" description="Test Cluster root for encryption">
    <field name ="name" type= "String"/>
    <field name ="address" type= "String"/>
    <field name ="phone" type= "String"/>
</cluster-root>
```

Thus, pseudo code 1 provides a definition of a business object at the application layer of the application 102, and the metadata modification engine 126, representing a suitable processing or parsing engine, is configured to convert the meta language description of the business object of pseudo code 1 into a business object. Specifically, pseudo code 2 provides an example business object in the java programming language. Thus, the meta language definition of FIG. 1 is understood to be associated with a suitable engine to parse the definition of pseudo code 1 and convert the definition of pseudo code 1 into an object structure (pseudo code 2) that may be used in the application 102 at runtime.

Pseudo code 2

```
public class BusinessObject {
    private String businessObjectId;
    private String name;
    private String address;
    private String phone;
    ............... and Getters and Setters for these methods
}
```

Thus, while FIG. 2 is representative of an association between an object and its metadata, pseudo code 2 demonstrates an example of how an in-memory object model is represented by a class instance that may be loaded into memory 110 by an appropriate programming environment, such as a Java Virtual Machine (JVM) in a java environment. In this way, both the object meta structure 112 and the application object 114 are loaded in memory 110 and accessible during runtime of the application 102.

As described above specifically with respect to the example of FIG. 2, the meta language includes the meta objects ClassMeta and FieldMeta, which define, respectively, a class (or cluster root) and a field within the system. Table 1 illustrates a further example of the basic structure of metadata classes used to store information related to a cluster root in the example:

TABLE 1

| ClassMeta | FieldMeta |
|---|---|
| public class ClassMeta<br>{<br>// fully qualified class name<br>public String name;<br>// a field path<br>public String description;<br>public FieldMeta[ ];<br>............... getters and setters<br>} | public class FieldMeta<br>{<br>public String fieldName;<br>public String fieldType;<br>// other properties<br>............... getters and setters<br>} |

Thus, the meta object structure of FIG. 2 and Table 1 allows the application 102 to use the class and field configurations in the application layer in association with any processing of data, such as when reconstituting an object during loading of data from the storage layer 104, or while saving the object created in the application layer to the storage layer represented by the storage layer 104. As also described, along with the object definition for the application object 114, the object metadata structure 112 may also be generated in the same language (e.g., in the programming language java, in the present example). Consequently, the object metadata structure, or meta structure for the application object 114 represented by the object of pseudo code 1 and pseudo code 2, above, may be represented using the meta structure of FIG. 2 and Table 1, as illustrated in pseudo code 3:

Pseudo code 3

```
ClassMeta {
    name: "com.buisness.BusinessObject";
    description: "Test Cluster root for encryption";
    FieldMeta: {
        {
            fieldName: "name";
            fieldType: "java.lang.String";
            .........
        };
        {
            fieldName: "address";
            fieldType: "java.lang.String";
            .........
        };
        {
            fieldName: "phone";
            fieldType: "java.lang.String";
            .........
        };
    }
}
```

As generally described with respect to FIG. 1, this object oriented meta structure of pseudo code 3 may be used across the application layer of the application 102, while integrating with a database of the storage layer 104, and with other applications. As described, when the application 102 boots up in conjunction with the bootstrap system 118, the meta structure 112, along with meta structures of all the cluster roots in the system, may be loaded and maintained in an unmodifiable map for subsequent lookup procedures. Consequently, it is possible for the metadata examination engine 124 and other components of the application 102 to interact directly with the meta structures of objects, when operating on the objects.

As also described above, in order to support the encryption of fields within the application object 114, a new attribute called "encryptable" may be included at a field level within the meta definition layer. The metadata examination engine 124 is configured to recognize this field level meta attribute, and generate corresponding getters and setters for this encryptable attribute at the field level. In this context, such getters and setters are functions that may be used according to standard techniques for protecting access to private strings.

Thus, in a specific example, the meta definition given in pseudo code 1 may be modified by the metadata modification engine 126, so that the updated meta definition of the object metadata structure 112 is as provided in pseudo code 4:

---
Pseudo code 4
---
```
<cluster-root name= "com.buisness.BusinessObject" description="Test Cluster root for encryption">
    <field name= "name" type= "String" encryptable="true" />
    <field name= "address" type= "String"/>
    <field name= "phone" type= "String" encryptable="true" />
</cluster-root>
```

As shown, the field name of "name" and of type "string" is modified to include encryptable=true as a field level meta attribute. Similar comments apply to the field name "phone," while the field name "address" is not marked as encryptable.

Then, the ClassMeta of the modified definition of pseudo code 4 is provided in pseudo code 5:

---
Pseudo code 5
---
```
ClassMeta {
    name: "com.buisness.BusinessObject";
    description: "Test Cluster root for encryption";
    FieldMeta: {
        {
            fieldName: "name";
            fieldType: "java.lang.String";
            encryptable: "true"
            ........
        };
        {
            fieldName: "address";
            fieldType: "java.lang.String";
            ........
        };
        {
            fieldName: "phone";
            fieldType: "java.lang.String";
            encryptable: "true"
            ........
        };
    }
}
```

In the multi-tenant architecture of FIG. 1, the described techniques enable per tenant opt-in features for the described encryption capabilities. In order to identify tenants who do opt-in for the encryption features described herein, the tenant ID 116 may be associated with a corresponding data field that may be marked, e.g., as true or false, to indicate whether the corresponding tenant has opted in or not in. For example, Table 2 illustrates a simplified example in which three tenants are listed in a tenant table, and, as shown, tenants 1 and 3 have opted in for the encryption feature, while tenant 2 has not. Thus, in the example, as shown in Table 2, a tenant may be associated with a Boolean field named "opted in," which may have a default value of false, which is then updated to true when a corresponding tenant opts in for the described encryption features.

TABLE 2

| Tenant ID | Name | Opted-in | Property 1 | Property 2 | Property 3 | Property 4 |
|---|---|---|---|---|---|---|
| ID-1 | Tenant-1 | True | ... | ... | ... | ... |
| ID-2 | Tenant-2 | False | ... | ... | ... | ... |
| ID-3 | Tenant-3 | True | ... | ... | ... | ... |

Thus, an appropriate application layer component, such as the metadata examination engine 124 may be configured to utilize a combination of the encryptable attribute from the metadata, together with the opted in field from the tenant data, in order to determine whether or not the encryption/decryption should occur. This approach allows the application 102 to operate completely based on metadata of an object being operated on, in conjunction with the tenant data.

FIG. 3 is a flowchart 300 illustrating example operations of a system 100 of FIG. 1. In the example of FIG. 3, operations 302, 304, 306 are illustrated as separate, sequential operations. In various implementations, additional or alternative operations or sub-operations may be included, and/or one or more operations or sub-operations may be omitted. In all such implementations, any two or more operations or sub-operations may be executed in a partially or completely overlapping or parallel manner, or in a nested, iterative, branched, or looped fashion.

In the example of FIG. 3, at an object oriented application, a transfer of object data for an application object between the object oriented application and a database may be initiated (302). For example, the transfer may include a persisting of data of the application object 114 from the application 102 into a database of the storage layer 104, e.g., into the application data 108. Similarly, but conversely, the transfer of object data may include a reconstitution of object data from the application data 108 of the storage layer 104 as the application object 114 within the memory 110. As described, some examples of transferring application data from the storage layer 104 to the memory 110 may be implemented by the bootstrap system 118 during boot operations for the application 102. In other examples, the mapping engine 120 may be configured to initiate the transfer. For example, the mapping engine 120 may initiate the transfer in response to a user request, or as part of some automated procedure.

An object metadata structure of the application object may be examined, including field level metadata defining an encryption attribute for a field of the application object (304). For example, the metadata examination engine 124 may be configured to traverse a graph of the object metadata structure 112. Again, such metadata examination may occur in conjunction with boot operations of the bootstrap system 118, and/or in conjunction with mapping operations of the mapping engine 120.

At the object oriented application, an encryption-related operation may be executed on field level data of the field of the application object, based on the encryption attribute and in conjunction with the transfer of object data (306). For example, the encryption/decryption engine 122 may execute an encryption-related operation such as encryption of data being transferred to the storage layer 104, or decryption of data being received from the storage layer 104. As may be appreciated from the above description, instructions to the encryption/decryption engine 122 may be provided by, e.g., the metadata examination engine 124. Although not described here in detail, it will be appreciated that the various details of the encryption-related operations may be further specified, such as a type of encryption algorithm to be used from among a plurality of available encryption algorithms.

FIG. 4 is a flowchart 400 illustrating example object saving logic that may be implemented using the system 100 of FIG. 1. In the example of FIG. 4, a session for executing object saving logic is requested (402), such as when a user of the system 100 wishes to persist data to the storage layer 104. Data to be persisted is obtained by way of the application 102 (404), such as when data is entered by the user, or otherwise uploaded into, or provided to, the application 102.

The process continues with the selection of an object (406), and associated creation of an empty instance of the object (408) that is to be populated with the obtained data and persisted to the storage layer 104. For example, the requested session and associated object selection and creation of the corresponding empty object instance may be provided by the mapping engine 120.

A field of the selected object may be selected (410), and a value of the corresponding field may be set to a value corresponding to the data already received from the application (412). If the tenant in question has opted into the encryption techniques described herein (414), and if the field is marked as encryptable in the manner described above (416), then the field value may be encrypted and set within the object (418). For example, the metadata examination engine 124 may determine whether the appropriate tenant has opted in and/or whether the field is encryptable, then the encryption/decryption engine 122 may then proceed with the necessary encryption.

Once encryption occurs, or if the tenant has not opted in (414), or if the field has not been marked as encryptable (416), then operations may proceed with determining whether additional fields exist (420). If so, then the selection of the next field may proceed (410).

Otherwise, it may be determined whether any additional objects are included (420). If so, then the next objects may be selected (406). Otherwise, all of the populated object instances may be stored to the storage layer 104 (424).

Example pseudo code for implementing the techniques of FIG. 4 is provided below, in the example of pseudo code 6.

---
Pseudo code 6
---

```
<Request Session>
    Get Data from the Application (As entered by the user / or uploaded into the application)
        <For each object in the Request>
            ObjectInstance = Create an Empty Instance of the object
            <For Each Field in the Object>
                Value = Set to value as coming from the application;
                If (Tenant.hasOptedIn ( ) && Field.isEncryptable ( ))
                {
```

---
Pseudo code 6
---

```
                    Value = Encrypt (Value)
                }
                ObjectInstance.setValue (Field, Value)
            </For Each Field in the Object>
        </For each object in the Request >
        Store Object in the Database;
</ Request Session>
```

It will be appreciated that very similar logic may be used for object reconstitution, e.g., for restoring objects from the storage layer 104 for use within the application 102. Specifically, with reference to FIG. 4, corresponding object reconstitution logic would generally assume that data obtained would be obtained from the storage layer 104, that the empty instance of the object being created would be generated within the application 102 (e.g., within the memory 110), and the data value would be decrypted, rather than encrypted, if the tenant in question has opted in and the associated field has been marked as encryptable. An example of such object reconstitution logic is provided below in the example of pseudo code 7:

---
Pseudo Code 7
---

```
<Request Session>
    Get Data from the Database
        <For each object in the Request>
            ObjectInstance = Create an Empty Instance of the object
            <For Each Field in the Object>
                Value = Set to value returned from database;
                If (Tenant.hasOptedIn ( ) && Field.isEncryptable ( ))
                {
                    Value = Decrypt (Value)
                }
                ObjectInstance.setValue (Field, Value)
            </For Each Field in the Object>
        </For each object in the Request >
</ Request Session>
```

Figure 5:
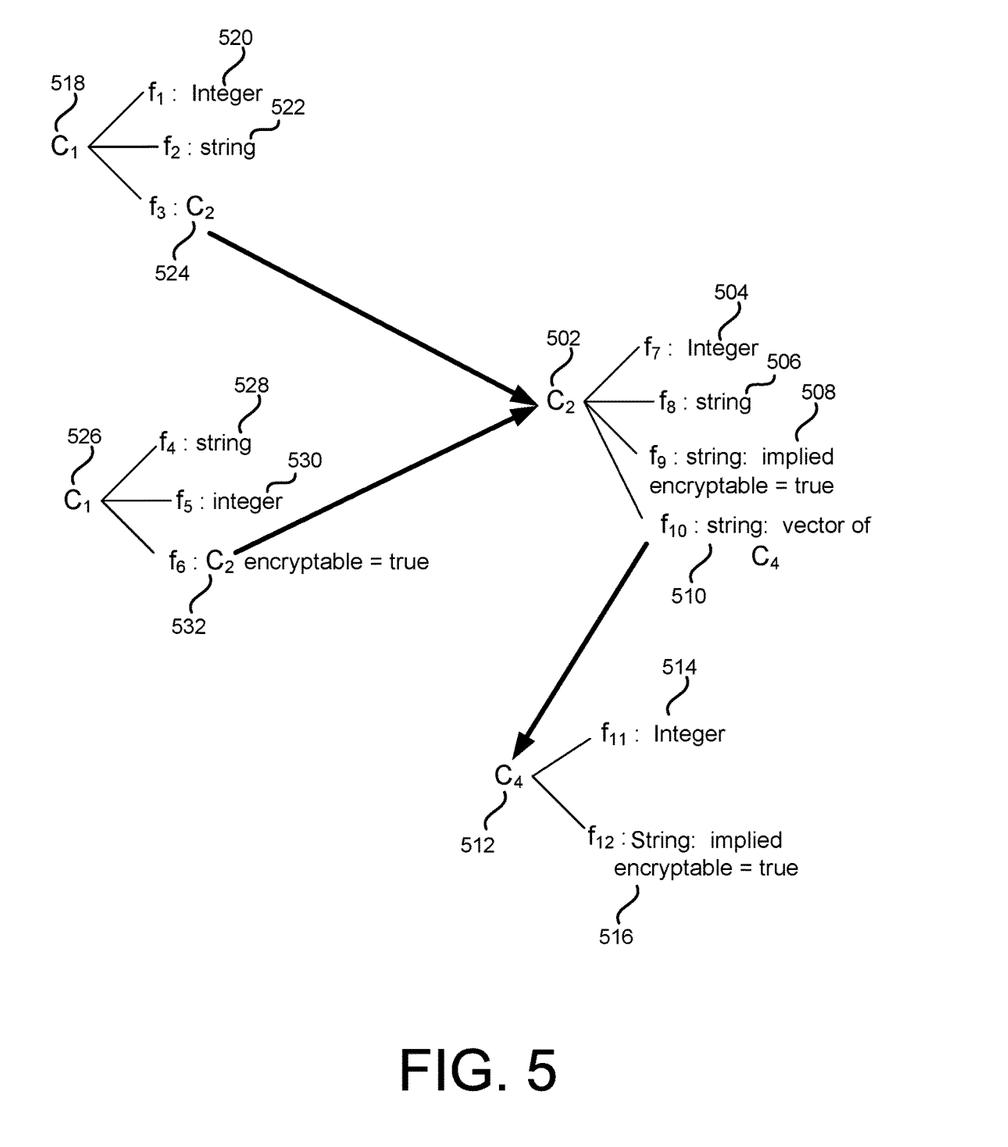
FIG. 5 is a block diagram of an example object metadata structure of the object metadata structure, in which complex field types are included.

FIG. 5 is a block diagram of an example object metadata structure of the object metadata structure 112, in which complex field types are included. In particular, FIG. 5 illustrates a complex field type 502 (illustrated in FIG. 5 as $C_2$). That is, as referenced above, a field of a FieldMeta structure may include various types, including simple field types such as a string, or an integer. In other implementations, a field type may include a complex field type in which an object having its own fields and associated ClassMeta and FieldMeta structures, and associated attributes, may be included.

For example, in the example of FIG. 5, a complex field type 502 is illustrated as an object metadata structure that includes its own fields, e.g., a field 504 including a string attribute, a field 506 including an integer attribute, and a field 508 including another string attribute. $C_2$ 502 is also illustrated as including its own complex field type 510, illustrated as a vector of type $C_4$ 512. As shown, $C_4$ 512 includes its own field types, including a field 514 including a string attribute, and a field 516 also including a string attribute.

As $C_2$ 502 and $C_4$ 512 each represent object metadata structures for corresponding objects that may be instantiated therefrom, it is possible within the system 100 to designate individual fields 504-510, and 514/516, as encryptable, in accordance with the techniques described above. However, in various implementations of the system 100, complex field types such as $C_2$ 502 and $C_4$ 512 do not exist in isolation, but rather, must be included as a complex attribute of a field of another object metadata structure or another object.

For example, in the example of FIG. 5, a separate object metadata structure 518 is illustrated as $C_1$ 518. As shown, $C_1$ 518 includes a field 520 that is a simple field type including an integer attribute, as well as a field 522 that is a simple field type including a string attribute. $C_1$ 518 also includes a third field 524, which is a complex field type that includes the already-described $C_2$ 502. Also in FIG. 5, another structure $C_3$ 526 includes a field 528 with a simple string attribute, a field 530 including a simple integer attribute, and a complex field 532 including $C_2$ 502.

Since $C_2$ 502 is an object metadata structure including a plurality of fields 504-510, it is possible within the system 100 to designate any of the fields 504-510 as being encryptable. However, since $C_2$ 502 is a complex field type that may be included within fields of other object metadata structures, it may occur that encryption is desired for a particular field of $C_2$ 502 within one parent object metadata structure, but not another. In particular, in the example of FIG. 5, within $C_1$ 518, the field 524 includes $C_2$ 502, and the field 524 is not marked as encryptable. On the other hand, within $C_3$ 526, the field 532 includes $C_2$ 502, and is marked with encryptable=true. Consequently, it will be appreciated that it would be problematic to mark $C_2$ 502 as including one or more encryptable fields, since doing so would result in encryption of the field 524 within $C_1$ 518 that is not desired.

In the example of FIG. 5, therefore, $C_2$ 502 may have fields designated with an attribute referring to as "implied encryptable," which designates that the corresponding field will be encrypted only when $C_2$ 502 is including within an encryptable field of one or more parent object metadata structures. For example, as shown, the field 508 of $C_2$ 502 is marked with "implied encryptable=true." In operation, when the metadata examination engine 124 of FIG. 1 traverses the overall object metadata structure of FIG. 5 as an example of the object metadata structure 112 of FIG. 1, the metadata examination engine 124 will traverse the structure of FIG. 5 beginning with $C_1$ 518. In so doing, in pertinent part, the metadata examination engine 124 will traverse from the field 524 to the fields 504-510 of $C_2$ 502. Since the field 524 is not designated as encryptable, when the metadata examination engine 124 encounters the implied encryptable designation for the field 508, the metadata examination engine 124 will not designate the field 508 for encryption.

Further, because the metadata structure of FIG. 5 is a tree structure, as already described above, $C_2$ 502 may include the field 510 that itself is a complex field type further designating $C_4$ 512. Consequently, the metadata examination engine 124 will also traverse $C_4$ 512 and its field 514, 516. Although the field 516, as illustrated, is marked with an implied encryptable value of "true," the metadata examination engine 124 will again not designate the field 516 for encryption, because the original field 524 was not marked for encryption.

Meanwhile, with reference to $C_3$ 526, as already described, the field 532 also includes the complex field type $C_2$ 502, but with the encryptable attribute value marked as "true." Consequently, when the metadata examination engine 124 traverses the metadata structure of FIG. 5 beginning with $C_3$ 526, the metadata examination engine 124 will reach the field 508 with the implied encryptable value set to "true," and will this time designate the field 508 for encryption. Similarly, as the metadata examination engine 124 continues to traverse the metadata structure of FIG. 5, the metadata examination engine 124 will reach the field 516 of $C_4$ 512. Again, because the field 532 is set to encryptable=true, and the field 516 has an attribute value of implied encryptable=true, the metadata examination engine 124 will designate the field 516 for encryption by the encryption engine 122.

For example, the class $C_2$ 518 may relate to services procurement for the application 102. Then the field $f_1$ 520 may have a field for project deliverables with a type of complex field known as 'multi-locale string.' The multi-locale string enables translation of data into one or more of a plurality of languages. However, since the field $f_3$ of the class $C_1$ is not marked as encryptable, the translations or other related data associated with the $f_9$ and $f_{11}$ fields are not encrypted, either.

Meanwhile, the class $C_3$ may represent, for example, a "plan item" class/object, in which the field $f_6$ 532 includes $C_2$ and is designated as 'encryption=true.' As a result, both the fields $f_9$ and $f_{11}$ 516 that are associated with the 'implied encryption' designation are encrypted.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium including instructions that, when executed by at least one computing device, are configured to cause the at least one computing device to at least:

initiate, at an object-oriented application at the at least one computing device, a transfer of object data for an application object between the object-oriented application and a relational database that is separate from the object-oriented application, wherein the object-oriented application and the relational database are implemented within a multi-tenant architecture for providing instances of the object-oriented application to a plurality of tenants, wherein the object-oriented application at the at least one computing device includes a mapping engine configured to initiate the transfer of the object data, an object metadata structure, and a tenant identifier to memory of the object-oriented application and/or to the relational database;

determine, at the object-oriented application based on a tenant table and the tenant identifier of a tenant of the plurality of tenants, that field level data encryption is enabled for the object data owned by the tenant;

examine, at the object-oriented application and in response to the determination that field level data encryption is enabled, the object metadata structure of the application object, including field level metadata defining an encryption attribute for a field of the application object, wherein the object-oriented application at the at least one computing device includes a metadata examination engine to examine the object metadata structure by at least traversing a graph of the object metadata structure to determine during runtime whether field level encryption is enabled for at least the field of the application object; and execute, at the object-oriented application and based on the encryption attribute being enabled, an encryption-related operation on the field level data of the field of the application object in conjunction with the transfer of the object data, wherein the encryption-related operation comprises encryption of the field level data, decryption of the field level data, or a combination thereof, and wherein the object-oriented application at the at least one computing device includes an encryption engine to execute the encryption-related operation on the field level data of the field to provide encryption-related operation during the transfer to, or storage at, the relational database that is separate from the object-oriented application.

2. The non-transitory computer-readable storage medium of claim 1, wherein the mapping engine is further configured to provide a first interface to object-oriented structures of the object-oriented application and provide a second interface to the relational database at the storage layer, and wherein application instances of the object-oriented application are shared among multiple tenants having data stored within the relational database, and the decrypting is executed in conjunction with tenant-specific bootstrap operations for a particular tenant mapped to a particular application instance.

3. The non-transitory computer-readable storage medium of claim 1, wherein the transfer of object data is from the object-oriented application to the relational database, and further wherein the encryption of the field level data is for population of the object data and stored within the relational database.

4. The non-transitory computer-readable storage medium of claim 1, wherein the object metadata structure is modified during runtime of the object-oriented application to include the field level metadata, and in response to the modification, the field of the application object, corresponding to the field level metadata, is added to the application object and populated with the field level data during runtime.

5. The non-transitory computer-readable storage medium of claim 1, wherein the field level metadata includes a complex field type identifying a second application object having second field level metadata defining a second encryption attribute for a second field thereof.

6. The non-transitory computer-readable storage medium of claim 5, wherein the instructions, when executed by the at least one computing device, are further configured to at least:

examine an object metadata structure of the application object including performing the encryption-related operation on second field level data of the second field in response to determining that the complex field type is identified as encryptable.

7. The non-transitory computer-readable storage medium of claim 1, wherein the transfer of object data is from the relational database to the object-oriented application, and further wherein the decryption of the field level data is for population of a field within a live instance of the application object within the object-oriented application.

8. A method of executing instructions stored on a non-transitory computer-readable storage medium using at least one computing device, the method comprising:

initiating, at an object-oriented application at the at least one computing device, a transfer of object data for an application object between the object oriented application and a relational database that is separate from the object-oriented application, wherein the object-oriented application and the relational database are implemented within a multi-tenant architecture for providing instances of the object-oriented application to a plurality of tenants, wherein the object-oriented application at the at least one computing device includes a mapping engine configured to initiate the transfer of the object data, an object metadata structure, and a tenant identifier to memory of the object-oriented application and/or to the relational database;

determining, at the object-oriented application based on a tenant table and based on the tenant identifier of a tenant of the plurality of tenants, that field level data encryption is enabled for the object data owned by the tenant;

examining, at the object-oriented application and in response to the determining that field level data encryption is enabled, the object metadata structure of the application object, including field level metadata defining an encryption attribute for a field of the application object, wherein the object-oriented application at the at least one computing device includes a metadata examination engine to examine the object metadata structure by at least traversing a graph of the object metadata structure to determine during runtime whether field level encryption is enabled for at least the field of the application object; and executing, at the object-oriented application and based on the encryption attribute being enabled, an encryption-related operation on the field level data of the field of the application object in conjunction with the transfer of the object data, wherein the encryption-related operation comprises encryption of the field level data, decryption of the field level data, or a combination thereof, and wherein the object-oriented application at the at least one computing device includes an encryption engine to execute the encryption-related operation on the field level data of the field to provide encryption-related operation during the transfer to, or storage at, the relational database that is separate from the object-oriented application.

9. The method of claim 8, wherein the transfer of object data is from the relational database to the object-oriented application, and wherein the decryption of the field level data is for population of a field within a live instance of the application object within the object-oriented application.

10. The method of claim 8, wherein the object metadata structure is modified during runtime of the object-oriented application to include the field level metadata, and in response to the modification, the field of the application object, corresponding to the field level metadata, is added to the application object and populated with the field level data during runtime.

11. A system comprising:
at least one computing device and at least one memory including computer program code, the at least one memory and computer program code configured to, with the at least one computing device, cause the system to at least:
initiate, at an object-oriented application at the at least one computing device, a transfer of object data for an application object between the object-oriented application and a relational database that is separate from the object-oriented application, wherein the object-oriented application and the relational database are implemented within a multi-tenant architecture for providing instances of the object-oriented application to a plurality of tenants, wherein the object-oriented application at the at least one computing device includes a mapping engine configured to initiate the transfer of the object data, an object metadata structure, and a tenant identifier to memory of the object-oriented application and/or to the relational database;

determine, at the object-oriented application based on a tenant table and based on the tenant identifier of a tenant of the plurality of tenants, that field level data encryption is enabled for the object data owned by the tenant;

examine, at the object-oriented application and in response to the determination that field level data encryption is enabled, the object metadata structure of the application object, including field level metadata defining an encryption attribute for a field of the application object, wherein the object-oriented application at the at least one computing device includes a metadata examination engine to examine the object metadata structure by at least traversing a graph of the object metadata structure to determine during runtime whether field level encryption is enabled for at least the field of the application object; and execute, at the object-oriented application and based on the encryption attribute being enabled, an encryption-related operation on the field level data of the field of the application object in conjunction with the transfer of the object data, wherein the encryption-related operation comprises encryption of the field level data, decryption of the field level data, or a combination thereof, and wherein the object-oriented application at the at least one computing device includes an encryption engine to execute the encryption-related operation on the field level data of the field to provide encryption-related operation during the transfer to, or storage at, the relational database that is separate from the object-oriented application.

12. The system of claim 11, wherein the transfer of object data is from the relational database to the object-oriented application, and wherein the decryption of the field level data is for population of a field within a live instance of the application object within the object-oriented application.

13. The system of claim 12, wherein application instances of the object-oriented application are shared among multiple tenants having data stored within the relational database, and the decrypting is executed in conjunction with tenant-specific bootstrap operations for a particular tenant mapped to a particular application instance.

14. The system of claim 11, wherein the object metadata structure is modified during runtime of the object-oriented application to include the field level metadata, and in response to the modification, the field of the application object, corresponding to the field level metadata, is added to the application object and populated with the field level data during runtime.

* * * * *